US008433842B2

(12) United States Patent
Tanik

(10) Patent No.: US 8,433,842 B2
(45) Date of Patent: *Apr. 30, 2013

(54) METHOD FOR COMMUNICATING WITH A NON-VOLATILE MEMORY STORAGE DEVICE

(75) Inventor: Haluk Kent Tanik, Mountain View, CA (US)

(73) Assignee: Sandisk Technologies Inc., Plano, TX (US)

( * ) Notice: Subject to any disclaimer, the term of this patent is extended or adjusted under 35 U.S.C. 154(b) by 208 days.

This patent is subject to a terminal disclaimer.

(21) Appl. No.: 11/771,165

(22) Filed: Jun. 29, 2007

(65) Prior Publication Data

US 2009/0006723 A1 Jan. 1, 2009

(51) Int. Cl.
*G06F 3/00* (2006.01)
(52) U.S. Cl.
USPC ............... 711/103; 711/115; 711/156; 710/5
(58) Field of Classification Search .................. 711/154, 711/103, 115, 156; 710/5
See application file for complete search history.

(56) References Cited

U.S. PATENT DOCUMENTS

| | | | | |
|---|---|---|---|---|
| 5,524,190 | A * | 6/1996 | Schaeffer et al. | ............. 715/205 |
| 6,496,900 | B1 * | 12/2002 | McDonald et al. | ........... 711/112 |
| 6,779,027 | B1 | 8/2004 | Schunicht et al. | |
| 6,804,730 | B1 | 10/2004 | Kawashima | |
| 6,883,043 | B2 * | 4/2005 | Horiguchi | ........................ 710/37 |
| 6,986,148 | B2 | 1/2006 | Johnson, Jr. et al. | |
| 7,054,901 | B2 * | 5/2006 | Shafer | ........................... 709/203 |
| 7,188,336 | B2 | 3/2007 | Humphries | |
| 2002/0032790 | A1 * | 3/2002 | Linderman | ................... 709/230 |
| 2002/0191223 | A1 * | 12/2002 | Ishikawa | ........................ 358/402 |
| 2003/0014512 | A1 * | 1/2003 | Tanimoto | ...................... 709/223 |
| 2003/0028731 | A1 * | 2/2003 | Spiers et al. | ................... 711/147 |
| 2003/0167367 | A1 * | 9/2003 | Kaushik et al. | ............... 710/302 |
| 2004/0030693 | A1 | 2/2004 | Toda | |
| 2004/0052166 | A1 * | 3/2004 | Udink et al. | ............... 369/30.24 |
| 2004/0205301 | A1 | 10/2004 | Hara et al. | |
| 2006/0157571 | A1 | 7/2006 | Ciesinger et al. | |
| 2006/0168395 | A1 * | 7/2006 | Deng et al. | ..................... 711/113 |
| 2007/0152058 | A1 * | 7/2007 | Yeakley et al. | .......... 235/462.01 |
| 2009/0006786 | A1 | 1/2009 | Tanik | |

OTHER PUBLICATIONS

Notification of Transmittal of the International Search Report and the Written Opinion of the International Searching Authority, or the Declaration for International Application No. PCT/US2008/068796 (Mar. 24, 2009).
Sunil et al., "XML Agent on Smart Cards," Smart Card Research and Advanced Applications VI, IFIP 18$^{th}$ World Computer Congress, pp. 1-16 (Aug. 22-27, 2004).
Dissanaike et al., "Utilizing XML-RPC or SOAP on an Embedded System," Proceedings of the 24$^{th}$ International Conference on Distributed Computing Systems Workshops (ICDCSW'04), pp. 1-3 (Mar. 23, 2004).

(Continued)

*Primary Examiner* — Kalpit Parikh
(74) *Attorney, Agent, or Firm* — Jenkins, Wilson, Taylor & Hunt, P.A.

(57) ABSTRACT

Method for a storage device is provided. The method includes interpreting a command from a host system, wherein a command parser module for a storage device interprets the command; and extracting information regarding an operation from the command, wherein the command parser module extracts the information and interfaces with the host system.

8 Claims, 4 Drawing Sheets

OTHER PUBLICATIONS

Urien, "Programming Internet Smartcard with XML Scripts," Lecture Notes in Computer Science, vol. 2140, pp. 228-241 (Jan. 1, 2001).
Winer, "XML-RPC for Newbies," http://www.davenet.smallpicture.com/1998/07/14/xmlRpcForNewbies.html, p. 1 (Jul. 14, 1998).
Garlan et al., "An Introduction to Software Architecture," Carnegie Mellon University, School of Computer Science, pp. 1-42 (Jan. 1994).
Final Official Action for U.S. Appl. No. 11/771,203 (Mar. 2, 2010).
Interview Summary for U.S. Appl. No. 11/771,203 (Dec. 15, 2009).
Non-Final Official Action for U.S. Appl. No. 11/771,203 (Sep. 2, 2009).
Interview Summary for U.S. Appl. No. 11/771,203 (Aug. 16, 2010).
Non-Final Official Action for U.S. Appl. No. 11/771,203 (Sep. 14, 2010).
Final Official Action for U.S. Appl. No. 11/771,203 (Mar. 28, 2011).
Interview Summary for U.S. Appl. No. 11/771,203 (Jan. 4, 2011).
Communication pursuant to Article 94(3) EPC for European Application No. 08 781 179.0 (Feb. 21, 2011).
Communication of European publication number and information on the application of Article 67(3) EPC for European Application No. 08 781 179.0 (Mar. 10, 2010).
Non-Final Official Action for U.S. Appl. No. 11/771,203 (Aug. 17, 2011).
Final Official Action for U.S. Appl. No. 11/771,203 (Apr. 12, 2012).
Non-Final Official Action for U.S. Appl. No. 11/771,203 (Jul. 26, 2012).

* cited by examiner

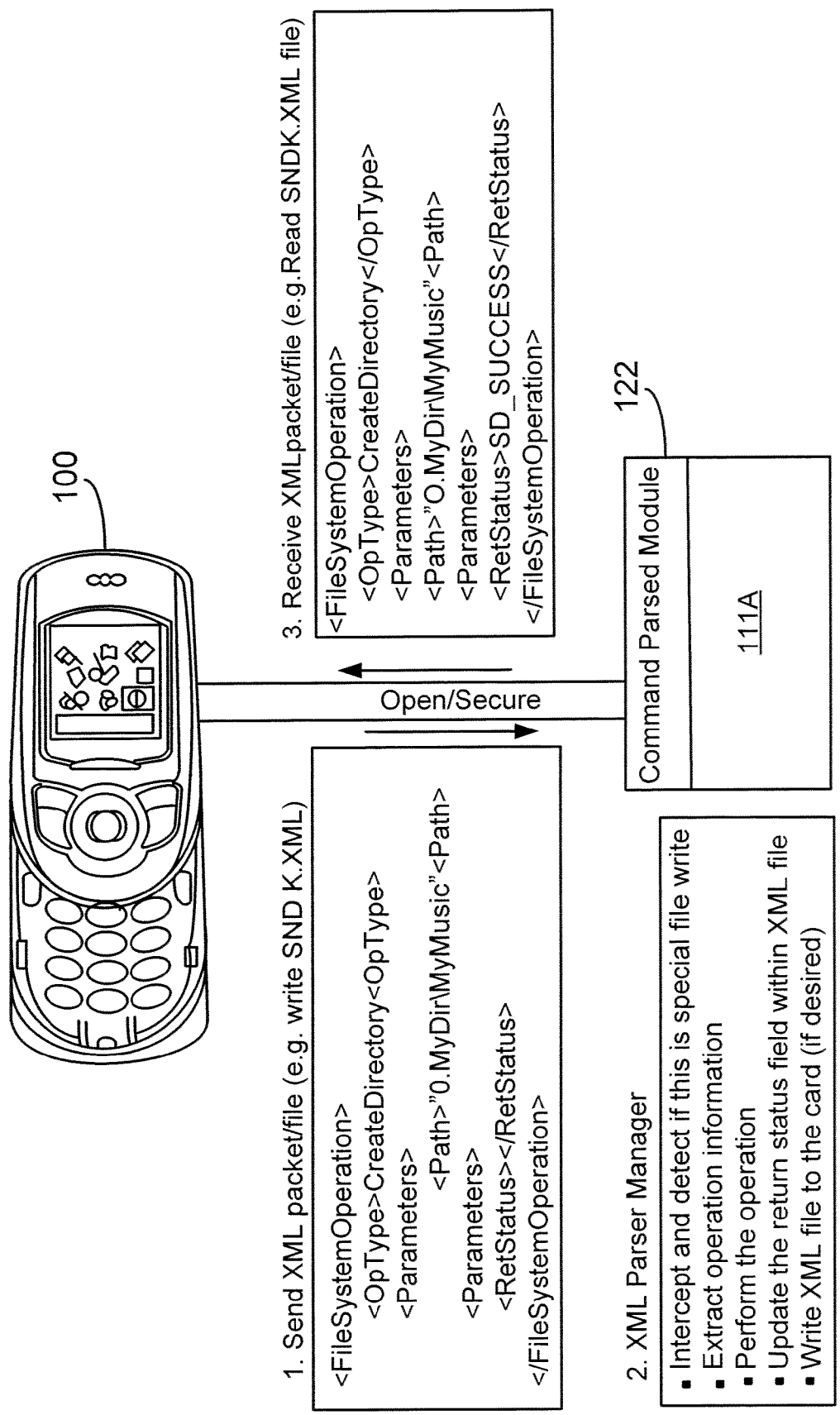

METHOD FOR COMMUNICATING WITH A NON-VOLATILE MEMORY STORAGE DEVICE

CROSS REFERENCE TO RELATED APPLICATION

This patent application is related to the U.S. patent application Ser. No. 11/771,203 entitled "SYSTEM FOR COMMUNICATING WITH A NON-VOLATILE MEMORY STORAGE DEVICE" filed on even date herewith, the disclosure of which is incorporated herein by reference in its entirety.

TECHNICAL FIELD

The present description relates to non-volatile memory storage devices, and more particularly, to communication with non-volatile memory storage devices.

RELATED ART

Non-volatile memory storage devices are commonly used to store information. These devices are used with cellular phones, digital cameras, desktop computers, laptop computers and other similar systems (jointly and interchangeably referred to herein as a "host system" or "host").

Different host system platforms use a software layer (may also be referred to as software development kit (SDK) layer) to communicate with a non-volatile memory storage device via a non-volatile memory storage device driver. Additional SDK layers may be used by host systems to access additional features of a non-volatile memory storage device that are not offered otherwise. Porting SDKs to different host system providers is a burden and it is desirable to reduce that burden.

SUMMARY

In one embodiment, a method for a storage device is provided. The method includes interpreting a command from a host system, wherein a command parser module for a storage device interprets the command; and extracting information regarding an operation from the command, wherein the command parser module extracts the information.

In another embodiment, a method for a storage device is provided. The method includes receiving a command from a host system in a platform independent format, wherein the storage device receives the command; interpreting the command, wherein a command parser module for the storage device interprets the command; extracting information regarding an operation from the command, wherein the command parser module extracts the information; and sending a response to the host system, after the operation is performed by the storage device, wherein the command parser module sends the response to the host system.

In yet another embodiment, a method for a storage device is provided. The method includes receiving a command from a host system in a platform independent format, wherein the storage device receives the command; detecting if the command includes an operational directive, wherein firmware code for the storage device detects if the command includes an operational directive; extracting information regarding an operation from the command, wherein a command parser module extracts the information; and sending a response to the host system, after the operation is performed by the storage device, wherein the command parser module sends the response to the host system.

This brief summary has been provided so that the nature of the description may be understood quickly. A more complete understanding of the description can be obtained by reference to the following detailed description of the preferred embodiments thereof in connection with the attached drawings.

BRIEF DESCRIPTION OF THE DRAWINGS

The foregoing features and other features will now be described with reference to the drawings of various embodiments. In the drawings, the same components have the same reference numerals. The illustrated embodiments are intended to illustrate, but not to limit the description. The drawings include the following Figures:

FIG. 3 shows an example of the process and system for communicating with a non-volatile memory device, according to one embodiment.

DETAILED DESCRIPTION

To facilitate an understanding of the various embodiments, the general architecture and operation of a computing system and a non-volatile memory storage device will first be described. The specific architecture and operation will then be described with reference to the general architecture.

Figure 1A:
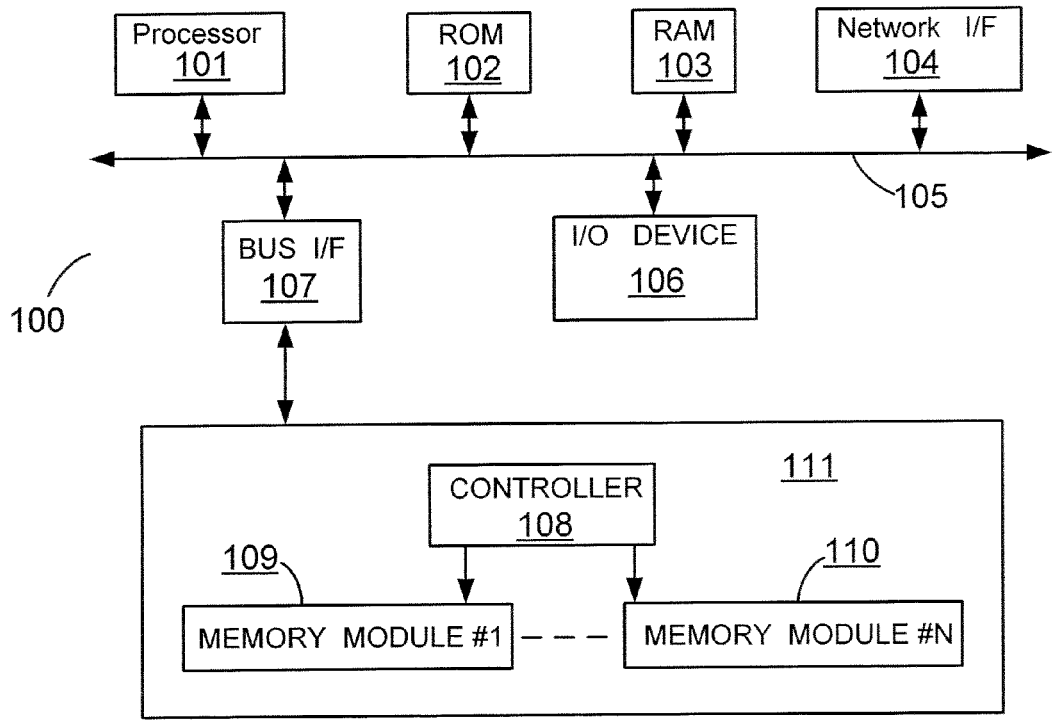
FIG. 1A shows a block diagram of a host system operationally coupled to a non-volatile memory device.

FIG. 1A shows a block diagram of a typical host system 100 that includes a central processing unit ("CPU") (or microprocessor or processor) 101 connected to a system bus 105. Random access main memory ("RAM") 103 is coupled to system bus 105 and provides CPU 101 with access to memory storage. When executing program instructions, CPU 101 stores the process steps in RAM 103 and executes the stored process steps out of RAM 103.

Host system 100 connects to a computer network (not shown) via network interface 104. One such network is the Internet that allows host system 100 to download applications, code, documents and others electronic information.

Read only memory ("ROM") 102 is provided to store invariant instruction sequences such as start-up instruction sequences or basic Input/output operating system (BIOS) sequences.

Input/Output ("I/O") devices 106, for example, a keyboard, a keypad, a pointing device ("mouse"), a monitor, a modem and the like are also provided.

Host system 100 is coupled to a non-volatile memory storage device 111 that includes a controller module 108 (may also be referred to as "memory controller" or "controller") and solid-state memory modules 109-110 (shown as Memory Module #1 and Memory Module #N). Controller module 108 interfaces with host processor 101 via a bus interface 107 or directly via system bus 105 or any another peripheral bus (not shown).

In one embodiment, non-volatile memory storage device 111 may be a flash memory device (or card). There are currently many different flash memory cards that are commercially available, examples being the CompactFlash (CF), the MultiMediaCard (MMC), Secure Digital (SD), miniSD, Memory Stick, SmartMedia and TransFlash cards. Although each of these cards has a unique mechanical and/or electrical interface (or any other type of interface, including a wireless interface) according to its standardized specifications (for example, the Universal Serial Bus (USB) specification based interface, incorporated herein by reference in its entirety), the flash memory included in each is very similar. These cards are all available from SanDisk Corporation, assignee of the present application.

SanDisk also provides a line of flash drives under its Cruzer trademark, which are hand held memory systems in small packages that have a Universal Serial Bus (USB) plug for connecting with a host system by plugging into the host's USB receptacle. Each of these memory cards and flash drives include controllers that interface with the host system and control operation of the flash memory within them.

Host systems (for example, 100) that use such memory cards and flash drives are many and varied. They include personal computers (PCs), laptop and other portable computers, cellular telephones, personal digital assistants (PDAs), digital still cameras, digital movie cameras and portable audio players. The host typically includes a built-in receptacle for one or more types of memory cards or flash drives but some require adapters into which a memory card is plugged.

Figure 1B:
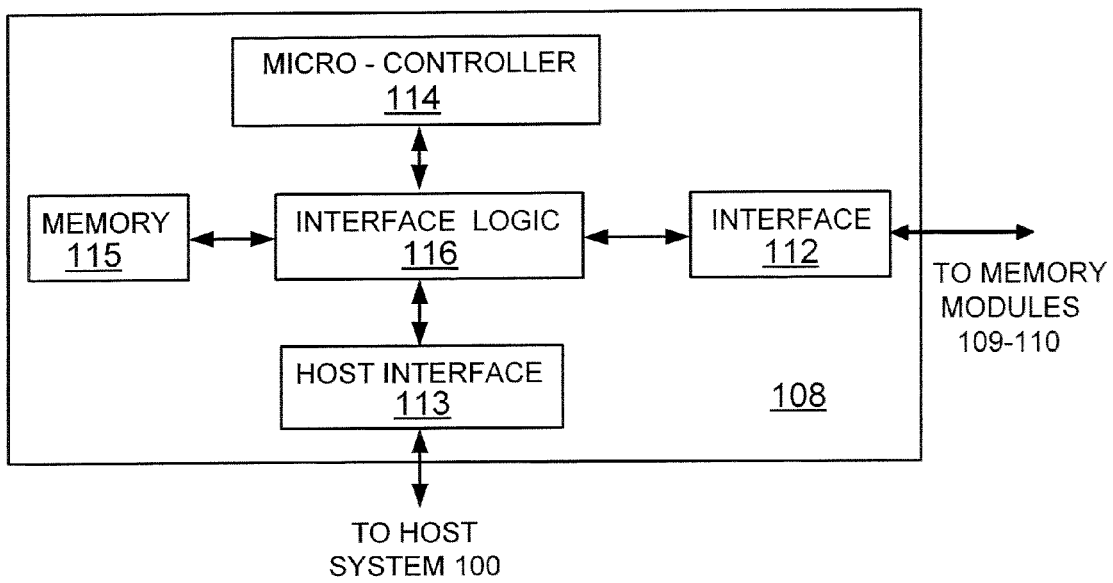
FIG. 1B shows an example of a block diagram of a memory controller for a non-volatile memory device.

FIG. 1B shows a block diagram of the internal architecture of controller module 108. Controller module 108 includes a microcontroller 114 that interfaces with various other components via interface logic 116. Memory 115 stores firmware and software instructions that are used by microcontroller 114 to control the operation of non-volatile memory storage device 111. Memory 115 may be volatile re-programmable random access memory ("RAM") a non-volatile memory that is not re-programmable ("ROM"), a one-time programmable memory or a re-programmable flash electrically-erasable and programmable read-only memory ("EEPROM").

A host interface 113 interfaces with host system 100, while a memory interface 112 interfaces with memory modules 109-110.

Figure 1C:
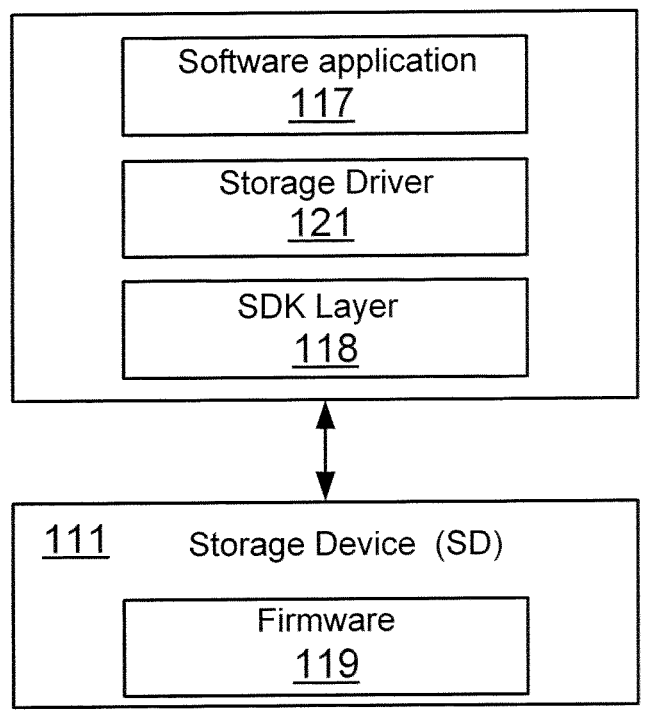
FIG. 1C shows a block diagram of a typical software architecture used to communicate with a non-volatile memory device.

FIG. 1C shows a top-level block diagram of a conventional operating system that uses a storage device driver 121 and SDK layer 118 to communicate with non-volatile memory storage device 111. A software application 117, executed by host system 100 sends commands for reading information stored in non-volatile memory storage device 111, writing information at non-volatile memory storage device 111, or for performing any other function. Micro-controller 114 executing firmware instructions 119 performs these operations.

Host system 100 may need SDK layer 118 to access non-volatile memory storage device 111. Different host system 100 may use different operating systems and hence different versions of SDK layer 118 are needed. This becomes burdensome for storage device providers and also may affect user experience of using non-volatile memory storage device 111.

Figure 1D:
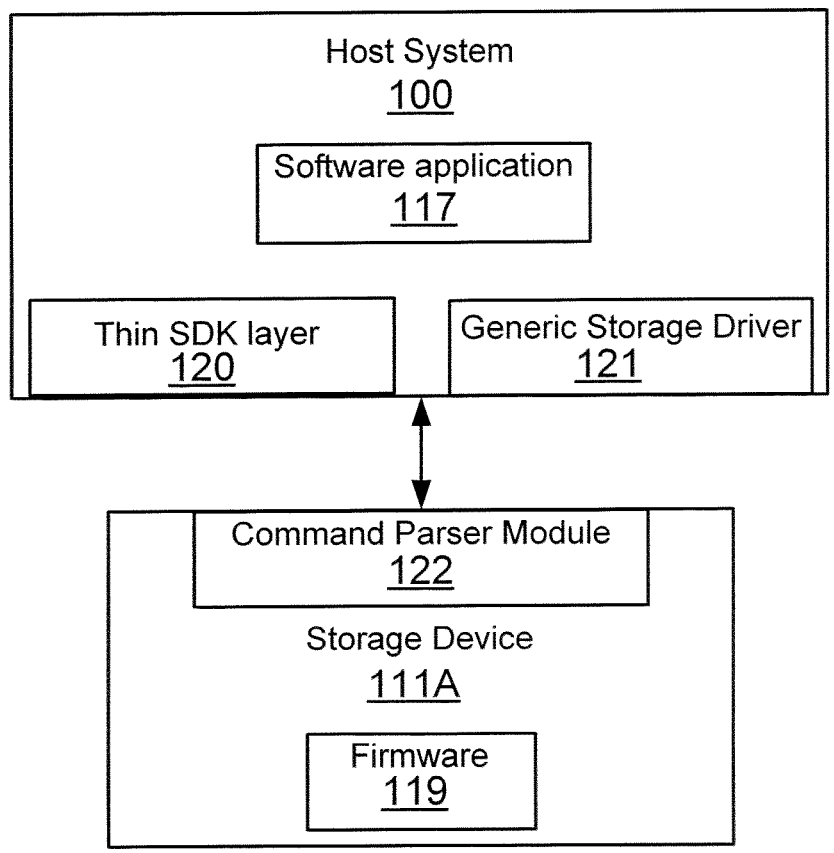
FIG. 1D shows a block diagram of a system with a command parser module, according to one embodiment.

In one embodiment, a simplified architecture is provided so that either SDK layer 118 is not needed or a partial SDK layer 120 (i.e. a thin version of SDK layer 118) (referred to as "thin SDK layer") is used to access non-volatile memory storage device 111A. FIG. 1D shows a block diagram of a top-level architecture that uses a platform independent format to communicate with non-volatile memory storage device 111A. Non-volatile memory storage device 111A includes all components of non-volatile memory storage device 111 and also includes a command parser module 122 for interfacing with host system 100, as described below.

Command parser module 122 parses commands that are sent by host system 100 via storage driver 121 and thin SDK layer 120. The commands are in a generic format so that individual SDK layer 118 is not needed for different host systems.

In one embodiment, command parser module 122 may be an XML parser. XML stands for Extensible Markup language, a standard markup language, defined by the W3C consortium, incorporated herein by reference in its entirety. XML is a text-based markup language that is becoming popular. As with HTML (hyper-text markup language), one identifies data using tags (for example, identifiers enclosed in angle brackets: <. . . >). Collectively, the tags are known as "markup". But unlike HTML, XML tags identify data, rather than specifying how to display it. Where an HTML tag may state "display this data in bold font" (<b>. . . </b>), an XML tag acts like a field name in a program. XML tags may be customized, based on different application type. In this embodiment, command parser module 122 is capable of receiving and interpreting an XML tag (command) from host system 100.

XML tags for various file system commands, for example, read, write, delete, create a directory and other commands are defined between partial SDK layer 120 and command parser module 122. An XML tag sent by host system 100 may include instructions to perform more than one operation, for example, to create a directory, write data and read data. Command parser module 122 extracts information regarding the operation and notifies the proper component/module of non-volatile memory storage device 111A (for example, microcontroller 114) to perform the operation.

Figure 2:
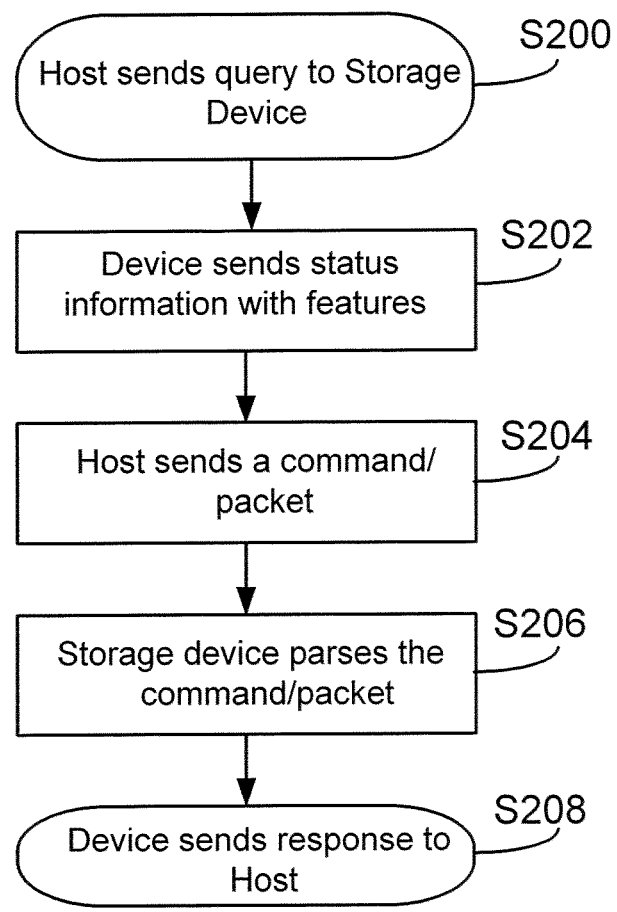
FIG. 2 shows a process flow diagram for communicating with a non-volatile memory device, according to one embodiment.

FIG. 2 shows a process flow diagram for communicating with non-volatile memory storage device 111A either using thin SDK layer 120 or without a SDK layer 118. The process begins in step S200, when host system 100 sends a query command to non-volatile memory storage device 111A. In step S202, non-volatile memory storage device 111A sends information regarding features that are supported by non-volatile memory storage device 111A.

In step S204, host system 100 sends a command in a platform independent format. The term platform independent format means that the command format does not depend on host system 100 operating system/environment. Examples of platform independent format include XML and others.

In step S206, command parser module 122 parses the command (or tag) and extracts information regarding any operation that the host system 100 wants to be performed. A single tag may include information regarding multiple operations. Command parser module 122 notifies the module that needs to perform the operation.

In step S208, the operation is performed and command parser module 122 sends a response back to host system 100, if host system 100 wants a response back.

The following provides an example of using XML tags, according to one embodiment. In this example, a host system may send a command to create a directory. The text in italics below shows the XML tags that may be used to perform this operation. The tag "Path" includes the directory name; and the tag "RetStatus" stores the operation "return status", if the host wants to know the status. The following shows the XML tags to create a directory:

```
<FileSystemOperation>
    <OpType>CreateDirectory</OpType>
```

-continued

```
<Parameters>
<Path>"0:\\MyDir\\MyMusic"</Path>
</Parameters>
<RetStatus></RetStatus>
</FileSystemOperation>
```

FIG. 3 shows an example of using the process steps of FIG. 2. In this example, host system 100 is a cell phone. Host system 10 creates a XML tag (or packet/file for example, "write SNDK.XML") for example, to create a directory. The XML tag is identified as a File System Operation. If non-volatile memory storage device 111A does not support the operation specified by the XML tag, then it can simply return a command stating "Interface_Not_Supported".

Before the tag is written, firmware 119 determines if the XML tag has operational directives. This may be achieved by using a special identifier that firmware 119 can use to identify a file system operation.

Command parser module 122 intercepts the XML packet and notifies the appropriate module to perform the requested operation. After the operation is performed, command parser module 122 sends a status XML packet to host system 100.

If host system 100 wants to check the status of the operations, host system 100 can read the tag back, for example, as shown in FIG. 3, creating "0:\\myDir\\MyMusic" returns "SD_SUCCESS".

In one embodiment, partial or no SDK layers are needed to communicate and access non-volatile memory storage device features.

It is noteworthy that although the foregoing embodiments have been illustrated using a non-volatile memory storage device, the foregoing embodiments may be implemented in any type of storage device, including hard disks, tape drives or any other storage device that uses a memory controller, state machine or any other type of hardware/software to interface with a host system.

While the present description is described above with respect to what is currently considered its preferred embodiments, it is to be understood that the description is not limited to that described above. To the contrary, the description is intended to cover various modifications and equivalent arrangements within the spirit and scope of the appended claims.

What is claimed is:

1. A method for a removable non-volatile memory storage device, the method comprising:
 receiving, at the removable non-volatile memory storage device, a file from a host system;
 determining whether the file contains a command in an interface-independent format that requests an operation by the removable non-volatile memory storage device;
 upon a determination that the file contains a command that requests an operation by the removable non-volatile memory storage device, using a command parser module located within the removable non-volatile memory storage device to interpret the contained command, extract information regarding the operation from the contained command, modify the contents of the received file to contain the response to be provided to the host system after the operation has been performed, and write the modified file to the removable non-volatile memory storage device, wherein the modified file is returned to the host system in response to the host system issuing to the removable non-volatile memory storage device a request to read the file; and
 upon a determination that the file does not contain a command that requests an operation by the removable non-volatile memory storage device, writing the file to the non-volatile memory storage device.

2. The method of claim 1, wherein using the command parser module to interpret the contained command comprises using the command parser module to interpret information regarding a plurality of operations that is embedded in the command.

3. The method of claim 1, wherein using the command parser module to interpret the contained command comprises providing information regarding the operation to a module of the removable non-volatile memory storage device.

4. The method of claim 3, wherein the module is a microcontroller.

5. The method of claim 1, wherein the command parser module is an XML parser.

6. The method of claim 1, wherein providing a response to the host system includes sending to the host system a file that contains the response to be provided to the host system.

7. The method of claim 1, wherein the command parser module interfaces with the host system via a partial software layer.

8. The method of claim 1, wherein determining whether the file contains a command that requests an operation by the removable non-volatile memory storage device comprises determining whether the file contains a command that requests an operation by the removable non-volatile memory storage device by at least one of: the command parser module located within the removable non-volatile memory storage device; and firmware within the removable non-volatile memory storage device.

\* \* \* \* \*